No. 850,975.

PATENTED APR. 23, 1907.

L. P. SHAW.
NUT LOCK.
APPLICATION FILED NOV. 24, 1906.

WITNESSES:
Thos. W. Riley
L. W. Anderson

INVENTOR
L. P. Shaw
BY
W. J. FitzGerald & Co.
Attorneys

THE NORRIS PETERS CO., WASHINGTON, D. C.

UNITED STATES PATENT OFFICE.

LEANDER P. SHAW, OF BRADFORD, PENNSYLVANIA.

NUT-LOCK.

No. 850,975.  Specification of Letters Patent.  Patented April 23, 1907.

Application filed November 24, 1906. Serial No. 344,822.

*To all whom it may concern:*

Be it known that I, LEANDER P. SHAW, a citizen of the United States, residing at Bradford, in the county of McKean and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut-locks, and more particularly to that class adapted to be used in connection with vehicles to hold the nut on the end of the spindle; and my object is to provide a device of this class which will securely hold the nut in position upon the end of the spindle and prevent the same from rotating when the vehicle is pushed backward.

A further object is to provide suitable means for securing the locking mechanism into engagement with the spindle.

Other objects and advantages will be hereinafter referred to and more particularly pointed out in the claims.

Figure 1:
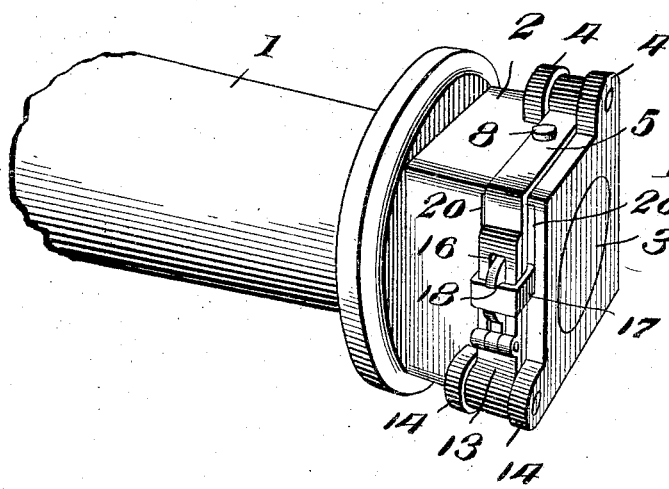
Figure 2:
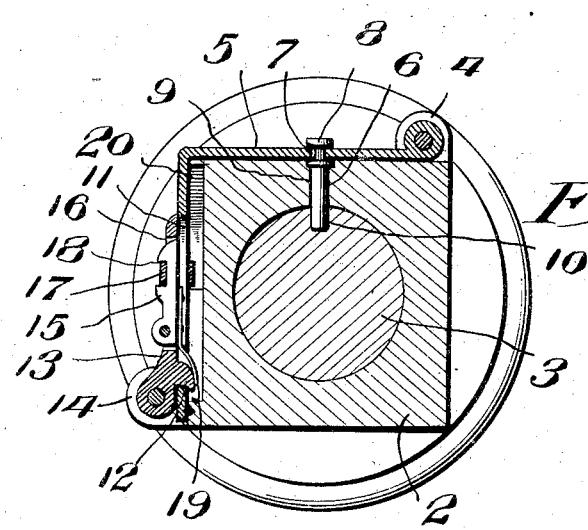

In the accompanying drawings, which are made a part of this application, Figure 1 is a perspective view of the end of a spindle, showing my improved locking mechanism applied to the nut; and Fig. 2 is a transverse sectional view through the nut, spindle, and locking mechanism.

Referring to the drawings, in which similar reference-numerals designate corresponding parts throughout the several views, 1 indicates a spindle, which may be of the usual or any preferred form, such as is employed in connection with vehicles to retain the wheel, and 2 indicates my improved form of nut, which is adapted to be directed onto the reduced end 3 of the spindle to hold the wheel in position on the spindle. Formed upon one face of the nut 2 are ears 4, between which is pivotally secured one end of an angular plate 5, the horizontal portion of said plate having secured thereto a locking-pin 6, said pin being directed through an opening 7 in the plate 5 and secured in position therein by disposing collars 8 at each side of the plate.

The locking-pin 6 is of sufficient length to extend entirely through a bore 9 in the nut and enter a socket 10 in the reduced end 3 of the spindle, so that when the nut is properly locked upon the reduced end 3 and the pin directed into the socket 10 the nut will be held against rotation upon the spindle.

In order to secure the angular plate so as to prevent casual removal of the locking-pin 6 from the socket 10, I have provided the vertical portion of the plate with an elongated slot 11, with the lower end of which is adapted to engage a finger 12, formed on the inner face of a locking-bar 13, the lower end of which is pivotally mounted between ears 14, formed upon the nut 2, and it will be seen that when the locking-bar is swung parallel with the vertical portion of the plate 5 that the finger 12 will enter the slot 11 and engage the metal at the lower end thereof and securely hold the locking-pin in position.

In order to retain the locking-bar in engagement with the vertical portion of the plate 5, I have provided a latch 15, which is pivotally secured in a slot 16, formed in the locking-bar 13, which is adapted to enter a keeper 17, slidably mounted upon the vertical portion of the plate 5, the latch being provided with a notch 18, in which is seated the keeper 17, when the parts are in their locked position. The latch is held in engagement with the keeper by means of a spring 19, which is fixedly secured to the latch and extended into engagement with the finger 12, and in order to permit the plate 5 to rest against the face of the nut I have provided said nut with a groove 20, which is adapted to receive the projecting end of the finger 12 and the keeper 17.

When it is desired to remove the nut, the latch 15 is directed inwardly until the keeper 17 is disengaged from the notch 18, after which the keeper is directed upwardly above the end of the locking-bar 13, when the bar is directed outwardly and the finger 12 disengaged from the slot 11. The plate 5 is then elevated sufficiently to disengage the locking-pin from the socket 10, whereupon the nut may be readily removed from the reduced end 3.

It will now be seen that I have provided a cheap and economical device for securing the nut to the end of the spindle, and it will further be seen that I have provided means for locking the securing mechanism in place.

What I claim is—

1. In a nut-lock the combination with a spindle and a nut therefor; of a plate pivotally secured to said nut, a locking-pin carried by said plate, a locking-bar pivotally secured to the nut, means on said locking-bar to engage the plate and hold the locking-pin in position and means on said plate adapted to engage said locking-bar and hold the same in juxtaposition to said plate.

2. In a nut-lock the combination with a spindle having a socket therein and a nut for said spindle; of a plate pivotally secured to said nut, a locking-pin carried by said plate and adapted to engage said socket, a locking-bar pivotally secured to the nut, a finger on said locking-bar adapted to enter a slot in said plate whereby the locking-pin will be held in engagement with the socket and means to engage said locking-bar and plate to hold said finger in the slot.

3. The combination with a nut; of a plate pivotally secured thereto, a locking-pin fixedly secured to said plate adapted to enter a slot in a spindle, a locking-bar pivotally secured to said nut, a finger on said locking-bar adapted to engage a slot in the plate, a keeper slidably mounted on said plate, a latch pivotally secured to said locking-bar and having a notch therein adapted to engage said keeper.

4. The combination with a nut; of a plate pivotally secured thereto, said plate having a horizontal and vertical portion, a locking-pin carried by said horizontal portion adapted to enter a slot in a spindle, a locking-bar pivotally secured to said nut, a finger on said locking-bar adapted to engage a slot in the vertical portion of said plate, a latch carried by said locking-bar, and means on said vertical portion of the plate adapted to engage said locking-bar and latch whereby the finger will be held into engagement with said slot.

In testimony whereof I have signed my name to this specification in the presence of two subscribing witnesses.

LEANDER P. SHAW.

Witnesses:
E. B. BOYLSTON,
W. D. LESH.